US005901838A

United States Patent [19]

Nakatani et al.

[11] Patent Number: 5,901,838

[45] Date of Patent: May 11, 1999

[54] FORCE STORING MECHANISM

[75] Inventors: Ichizo Nakatani; Mitsuharu Okuno; Masao Narita, all of Tokyo, Japan

[73] Assignee: Mitsubishi Denki Kabushiki Kaisha, Tokyo, Japan

[21] Appl. No.: 09/022,039

[22] Filed: Feb. 11, 1998

[30] Foreign Application Priority Data

Apr. 17, 1997 [JP] Japan .................................... 9-100292

[51] Int. Cl.[6] ............................ F16H 55/00; H01H 33/02

[52] U.S. Cl. ........................... 200/400; 200/501; 218/154

[58] Field of Search .................................. 200/17 R, 400, 200/401, 500, 501, 323, 324, 325, 337; 218/1, 7, 14, 78, 84, 92, 120, 140, 153, 154

[56] References Cited

U.S. PATENT DOCUMENTS

| | | | |
|---|---|---|---|
| 4,095,676 | 6/1978 | Howe et al. | 185/40 R |
| 4,153,828 | 5/1979 | Barkan | 200/153 SC |
| 4,409,449 | 10/1983 | Takano et al. | 200/153 SC |
| 4,742,200 | 5/1988 | Marquardt et al. | 200/325 |
| 5,280,258 | 1/1994 | Opperthauser | 335/162 |
| 5,584,383 | 12/1996 | Matsuo et al. | 200/400 |
| 5,723,836 | 3/1998 | Okuno et al. | 200/501 |

FOREIGN PATENT DOCUMENTS

| | | | |
|---|---|---|---|
| 1-154418 | 6/1989 | Japan | H01H 33/40 |
| 9-106741 | 4/1997 | Japan | H01H 33/40 |

*Primary Examiner*—Michael A. Friedhofer

*Attorney, Agent, or Firm*—Burns, Doane, Swecker & Mathis, LLP

[57] ABSTRACT

An operating mechanism having a guiding circular plate (9*b*) provided at a side surface of a gear wheel (9), an annular groove (15*d*) formed in a pinion (15) into which the guiding circular plate (9*b*) is fitted whereby the relative position in axial direction between the pinion (15) and the gear wheel (9) does not change even if there is an axial displacement of the gear wheel (9) or the pinion (15) due to a play. Accordingly, there is obtainable a stable angular position of the gear wheel (9) in the disconnection between the pinion (15) and a clutch driving element (16), via a cam constituted by a end-face cam (a projection) (9*a*) provided at a side surface of the gear wheel (9) and the clutch driving element (16).

4 Claims, 12 Drawing Sheets

FORCE STORING MECHANISM

BACKGROUND OF THE INVENTION

1. Field of the Invention

The present invention relates to an improvement of a force storing mechanism having a closing spring for a circuit breaker.

2. Discussion of Background

There is a requirement by a standard for the operation mechanism of a circuit breaker to have such a construction that the opening and closing of a circuit can be performed in succession without a delay. In order to meet the requirement of such standard, there is a conventional technique wherein a circuit closing operation is performed by the aid of an electric motor immediately after a circuit opening operation has been performed by using a mechanical energy stored in a force storing mechanism (a spring is generally used therein) so that energy is stored in the force storing mechanism for a successive circuit opening operation.

As a conventional mechanism for operating a circuit breaker, the construction and operation of the operation mechanism as disclosed in Japanese Unexamined Patent Publication JP-A-9-106741 (Japanese Patent Application JP7-264203) will be described.

FIG. 8 is a front view showing the construction of an operation mechanism of circuit breaker in its circuit-closing state; FIG. 9 is a cross-sectional view taken along a line A—A in FIG. 8; FIG. 10 is an enlarged view of a portion in FIG. 9; and FIG. 11 is a perspective view showing the detail of parts shown in FIG. 9. FIGS. 12*a* and 12*b* are diagrams showing the operations of the portion shown in FIG. 10. Throughout the Figures, expression showing directions of rotation are used on the basis of FIG. 8.

A lever 2 linked with a movable contact 100 (expressed by a sign of circuit in FIG. 8) is fixed to a main shaft 3 to which a rotating force is applied clockwise by a breaking spring 87 (expressed by a sign of spring), and is held in a closing position by a tripping latch 4. When the tripping latch 4 is turned counterclockwise by a tripping trigger mechanism 5, the lever 2 is turned counterclockwise to open the movable contact 100.

A gear wheel 9 is fixed to a cam shaft so as to rotate along with the cam shaft 8. A connecting pin 88 is provided on a side surface of the gear wheel 9. A closing lever 7 is fixed to a closing main shaft 6 to which a rotating force is applied counterclockwise by a closing spring (expressed by a sign of spring). A link 10 is provided to link the connecting pin 88 to an end portion of the closing lever 7. A lever crank mechanism (hereinafter, simply referred to as "mechanism") is formed by a crank formed between the center of the gear wheel 9 and the connecting pin 88; the link 10 as a connecting rod; and the closing lever 7 as a driver.

The gear wheel 9 is kept by a closing latch 11 at its closing awaiting position which is slightly shifted clockwise from a change point (an upper dead point) of the mechanism (i.e., a state shown in FIG. 8). When the closing latch 11 is turned counterclockwise by the actuation of a closing trigger mechanism 12, the closing lever 7 is turned counterclockwise and the gear wheel 9 is turned clockwise, respectively, by the mechanical energy stored in the closing spring 89. A cam 13 fixed to the cam shaft 8 together with the gear wheel 9 is rotated so that the lever 2 in its breaking position is returned to its closing position against the rotating force of the breaking spring 87 to thereby close the movable contact 100.

At the same time, a pinion 15 meshed with the gear wheel 9 is rotated counterclockwise through a clutch driving means 16 by the aid of an electric motor 17. Then, the gear wheel 9 is rotated clockwise against the rotating force of the closing spring 89 so as to return to the state shown in FIG. 8.

The above-mentioned elements are assembled with a frame 1 to form an operation mechanism. Among these elements, elements for transmitting a force from the electric motor 17 to the enclosing spring 89 via the clutch driving element 16, the pinion 15, the gear wheel 9, the link 10, the closing lever 7 and so on, constitute a force storing mechanism.

A clutch shaft 14 and the rotating shaft of the electric motor 17 are disposed in parallel to the cam shaft 8. These three shafts are connected in a form of a series of gear wheels comprising the gear wheel 9, the pinion 15 formed in an end of the clutch shaft 14, the clutch driving element 16 having a gear element (an outer ring 19) at its outer circumference and a gear formed in an end of the rotating shaft of the electric motor 17. The pinion 15 and the clutch driving element 16 constitute a clutch.

The cam shaft 8 penetrates frame walls 1*a*, 1*b* so that it is supported by a pair of bearings at the penetrating portions. A cam 13 is firmly fitted to the cam shaft 8 at an intermediate position between the frame walls 1*a*, 1*b*, and the gear wheel 9 on which a projection (an end-face cam) 9*a* is provided is firmly fitted to one of the free ends (which is at the side of the frame wall 1*a*) whereby the cam shaft 8 and the cam 13 are rotated in one-piece along with the rotation of the gear wheel 9. The cam shaft 8 is prevented from the movement in the axial direction beyond a play in the bearings.

The clutch shaft 14 also penetrates the frame walls 1*a*, 1*b* so that it is supported by a pair of bearings at penetrating portions in the frame walls 1*a*, 1*b* so as to be rotatable. The pinion 15 is provided at the end of the clutch shaft 14 at the side of the frame wall 1*a*. The clutch shaft 14 is allowed to move to some extent in the axial direction.

The clutch shaft 14 is provided with an inner wheel 18 at its outer circumference in the end portion at the side where the gear wheel 9 meshes with the pinion 15. Further, the clutch shaft 14 is provided with a hollow portion 14*b* at a center portion thereof having a cylindrical wall surface which is concentric with the inner wheel 18.

The pinion 15 comprises a toothed wheel portion 15*a* meshed with the gear wheel 9 and a shaft portion 15*b* integrally formed therewith. The shaft portion 15*b* is fitted rotatably in the hollow portion 14*b* of the cam shaft 8 through a stopper member 14*c*.

The inner wheel 18 is fitted to the clutch shaft 14 so as to be movable in the axial direction together with the clutch driving element 16. Radial grooves 18*a* are formed in an end portion (the end opposing the pinion 15) to be meshed with the toothed wheel portion 15 of the pinion 15.

FIG. 11 is a perspective view of the pinion 15 and the inner wheel 18 to clarify the structure of the inner wheel 18.

The traveling distance of the clutch driving element 16 is regulated by the height of the projection 9*a* provided on the gear wheel 9 so that the meshing engagement between the pinion 15 and the radial grooves 18*a* of the inner wheel 18 is disconnected in the state that the clutch driving element 16 is pressed by the projection 9*a* and is moved toward the frame wall. While the gear wheel 9 is rotated clockwise to an appropriate location from a position which is slightly shifted clockwise from the change point of the mechanism to the closing awaiting position, the projection 9*a* provided on the gear wheel 9 presses the clutch driving element 16 toward the frame wall to move the clutch shaft 14 by a predetermined distance whereby the meshing engagement between the pinion 15 and the radial grooves 18*a* of the inner wheel 18 is disconnected.

The clutch driving element 16 is composed of the inner wheel 18, the outer wheel 19 and a one-way clutch 20 provided between the inner wheel 18 and the outer wheel 19 wherein the inner wheel 18 is fitted to the clutch shaft 14 so as to be rotatable and movable in the axial direction. The outer surface of the inner wheel 18 is fitted to the one-way clutch 20.

The outer wheel 19 is meshed at an outer peripheral toothed wheel portion thereof with a toothed wheel portion 17*a* formed in the shaft end of the electric motor 17 and fitted at the inner diametrical surface thereof with the one-way clutch 20 so that it is mutually rotatable with respect to the inner wheel 18 while not causing a relative movement in the axial direction. The one-way clutch 20 is adapted such that it transmits a torque from the outer wheel 19 to the inner wheel 18 only when the outer wheel 19 is rotated counterclockwise with respect to the inner wheel 18 as seen from the side of the pinion 15. The tooth width of the toothed wheel portion 17*a* formed in the end of the shaft of the electric motor 17 is formed so as to always mesh with the clutch driving element 16 even when it is displaced by the projection 9*a*.

A clutch spring 21 is disposed between the frame wall 1*a* and the clutch driving element 16 so as to push continually the clutch driving element 16 toward the pinion 15.

The operation of the mechanism will be described. The operation for storing a mechanical energy in the closing spring 89 after the closing of the movable contact 100 is as follows.

The electric motor 17 is rotated clockwise and the clutch driving element 16 is rotated counterclockwise by the toothed wheel portion 17*a* formed at the shaft end of the motor. When the closing spring 89 has released the mechanical energy, the projection 9*a* formed on a side face of the gear wheel 9 is at a position apart from the clutch driving element 16. Accordingly, the clutch driving element 16 is pressed by the clutch spring 21 so that the pinion 15 and the radial grooves 18*a* formed in the end portion of the inner wheel 18 are meshed with each other whereby the pinion 15 can be driven by the electric motor 17 through the clutch driving element 16.

When the gear wheel 9 is rotated and has slightly passed clockwise the change point of the mechanism, the projection 9*a* presses the clutch driving element 16 to move it toward the frame wall 1*b*. As a result, the linkage between the pinion 15 and the clutch driving element is disconnected. At this moment, the electric motor 17 does not drive the pinion 15.

After the disengagement of linkage between the pinion 15 and the clutch driving element 16, the gear wheel 9 is further rotated clockwise by a small amount by the force of the closing spring 89, and is stopped at its closing awaiting position by the closing latch 11.

Since the linkage between the clutch driving element 16 and the pinion 15 is disconnected just before the point where the mechanism reaches the closing waiting position, a force due to the output torque of the electric motor 17 is not applied to the closing latch 11 even if the electric motor 17 rotates due to inertia after the stopping of the gear wheel 9.

FIG. 12 is a cross-sectional view showing a relation among the projection 9*a*, the outer wheel 19 and the gear wheel 9 shown in FIG. 10 for the purpose of explaining the problem in the above-mentioned conventional technique.

The projection 9*a* provided on a side face of the gear wheel 9 moves in the direction of arrow mark in FIG. 12*a*. Symbols X1 and X2 in FIG. 12*b* show respectively the position of the projection 9*a* in a state that the projection 9*a* begins to contact with the outer wheel 19 (namely, the clutch begins to disconnect) and the position of the projection 9*a* in a state that the outer wheel 19 has been pushed by the projection 9*a* so that it has finished the movement (toward the upper portion of the paper surface of the Figure).

Since the projection 9*a* is brought to contact with a gentle slope formed in the outer wheel 19, there is a fair fluctuation, between the position X1 and the position X2, depending on a position of a top portion of the projection 9*a* (a vertical position or a height) which is brought to contact with the outer wheel 19.

As understood from FIG. 10, the position of the top portion of the projection 9*a* varies not only depending on the height of the projection 9*a* but also a position of the gear wheel 9 in the axial direction, namely, a shift of the cam shaft 8 in the axial direction. Further, the position of the outer wheel 19 is influenced by a position of the pinion 15 in the axial direction (i.e., a position of the clutch shaft 14 movable in its axial direction). Accordingly, it is necessary that the above-mentioned fluctuation is absorbed by adjusting the height of the projection 9*a* so as to obtain correct operational positions X1, X2 of the clutch. In the conventional technique, there was a problem that the adjustment was difficult since a slight difference of height of the projection 9*a* caused a substantial change of angular position of the gear wheel 9, and the adjustment took much labor. Specifically, in the conventional force storing mechanism adapted to disconnect the clutch by pressing the outer wheel by means of the projection, there was produced a fluctuation in angular position of the gear wheel at the time of disconnection (or connection) of the clutch due to a fluctuation in the relative distance between the gear wheel and the outer wheel and a fluctuation in height of the projection, which resulted a reduction in the performance of a circuit breaker installing the force storing device therein. Accordingly, it was insufficient to merely adjust correctly the height of the projection to a regulated dimension, and it was necessary to finely adjust the height at an actually working site.

SUMMARY OF THE INVENTION

It is an object of the present invention to provide a force storing mechanism which eliminates a fluctuation in angular position of the gear wheel at the time of the connection and disconnection of the clutch when the height of the projection is once met with a regulated dimension, and which unnecessitates adjustments of the height of the projection at an actually working site.

In accordance with the present invention, there is provided in a force storing mechanism for a circuit breaker wherein energy stored in a breaking spring is discharged to effect a circuit opening operation to a contact, and energy is stored in the breaking spring, by means of a cam shaft and a cam fixed to the cam shaft via a driving means which is driven by a motor, the force storing mechanism being characterized by comprising a gear wheel fixed to a cam shaft, a pinion meshed with the gear wheel, a clutch driving element provided on the same axis as the pinion, which constitutes a clutch together with the pinion, and is driven by an electric motor, and an end-face cam provided at a side surface of the gear wheel and being adapted to press the clutch driving element at or near a stationary position of the gear wheel to release the connection between the pinion and the clutch driving element, wherein the gear wheel has a guiding circular plate fixed to a side surface of the gear wheel, and the pinion has a groove fitted to the guiding circular plate so as to maintain a relative position in axial direction of the gear wheel and the pinion to be constant.

In the above-mentioned invention, a circular arc plate is provided instead of the guiding circular plate, at the periphery of the gear wheel in the vicinity of the position where the end-face cam is provided.

Further, in accordance with the present invention, there is provided in a force storing mechanism for a circuit breaker wherein energy stored in a breaking spring is discharged to effect a circuit opening operation to a contact, and energy is stored in the breaking spring, by means of a cam shaft and a cam fixed to the cam shaft via a driving means which is driven by a motor, the force storing mechanism being characterized by comprising a gear wheel fixed to a cam shaft, a pinion meshed with the gear wheel, a clutch driving element provided on the same axis as the pinion, which constitutes a clutch together with the pinion, and is driven by an electric motor, and an end-face cam provided at a side surface of the gear wheel and being adapted to press the clutch driving element at or near a stationary position of the gear wheel to release the connection between the pinion and the clutch driving element, wherein the pinion has a guiding circular plate fixed to a side surface of the gear wheel, and the gear wheel has a groove fitted to the guiding circular plate so as to maintain a relative position in axial direction of the gear wheel and the pinion to be constant.

Further, in accordance with the present invention, there is provided in a force storing mechanism for a circuit breaker wherein energy stored in a breaking spring is discharged to effect a circuit opening operation to a contact, and energy is stored in the breaking spring, by means of a cam shaft and a cam fixed to the cam shaft via a driving means which is driven by a motor, the force storing mechanism being characterized by comprising a gear wheel fixed to a cam shaft, a pinion meshed with the gear wheel, a clutch driving element provided on the same axis as the pinion, which constitutes a clutch together with the pinion, and is driven by an electric motor, and an end-face cam provided at a side surface of the gear wheel and being adapted to press the clutch driving element at or near a stationary position of the gear wheel to release the connection between the pinion and the clutch driving element, wherein the pinion has two guiding circular plates fixed to an intermediate position between the free end and the tooth surface of the pinion and the gear wheel is fitted to the space between the two guiding circular plates so as to maintain a relative position in axial direction of the gear wheel and the pinion to be constant.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

EMBODIMENT 1

Figure 1:
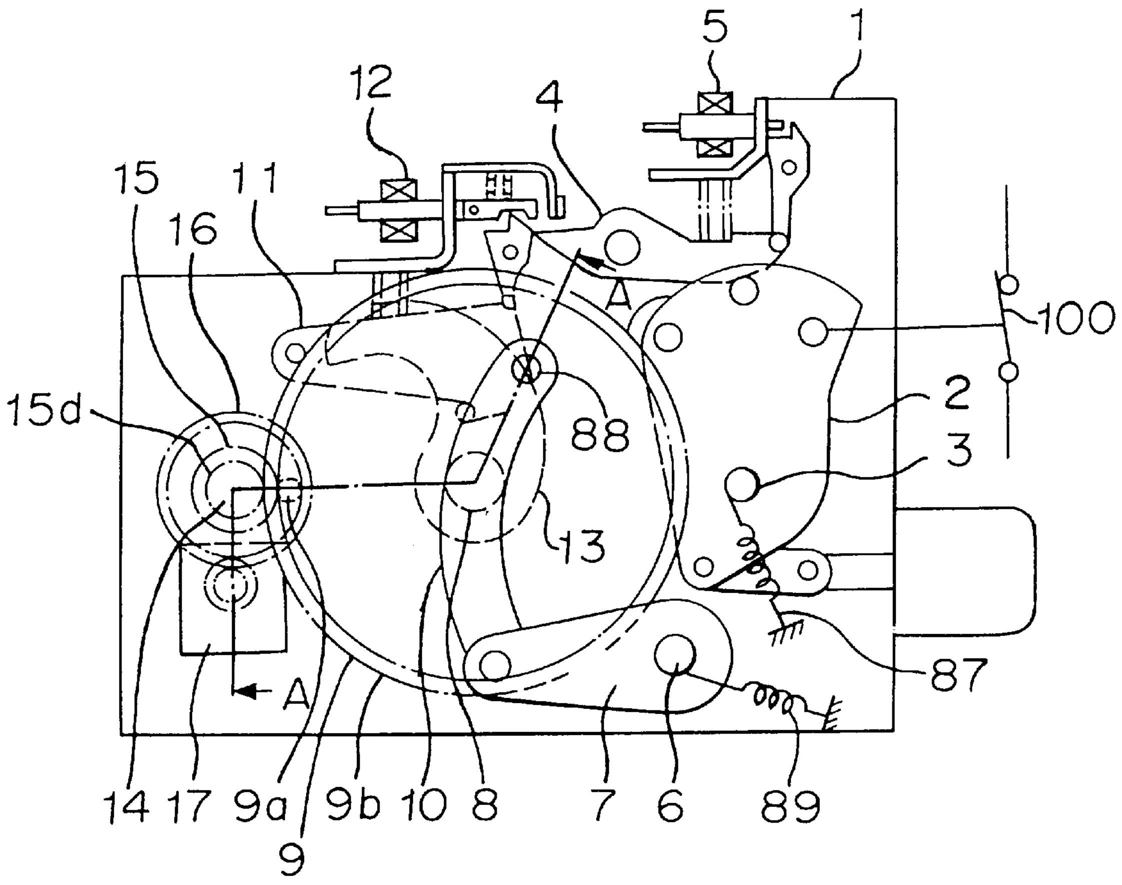
FIG. 1 is a front view of an operation means having a storage storing mechanism for a circuit breaker according to a first embodiment of the present invention.
Figure 2:
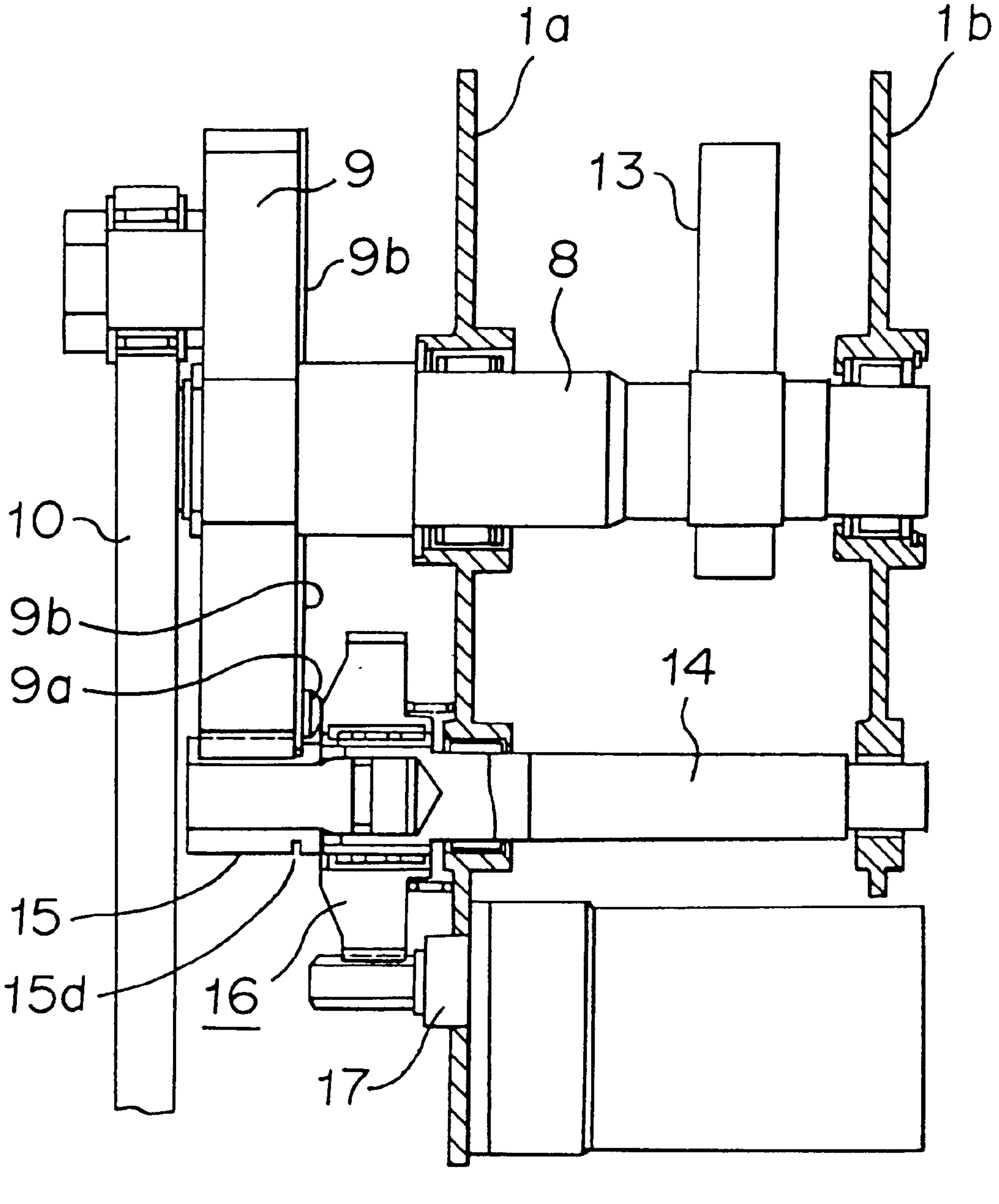
FIG. 2 is a cross-sectional view taken along a line A—A in FIG. 1.
Figure 3:
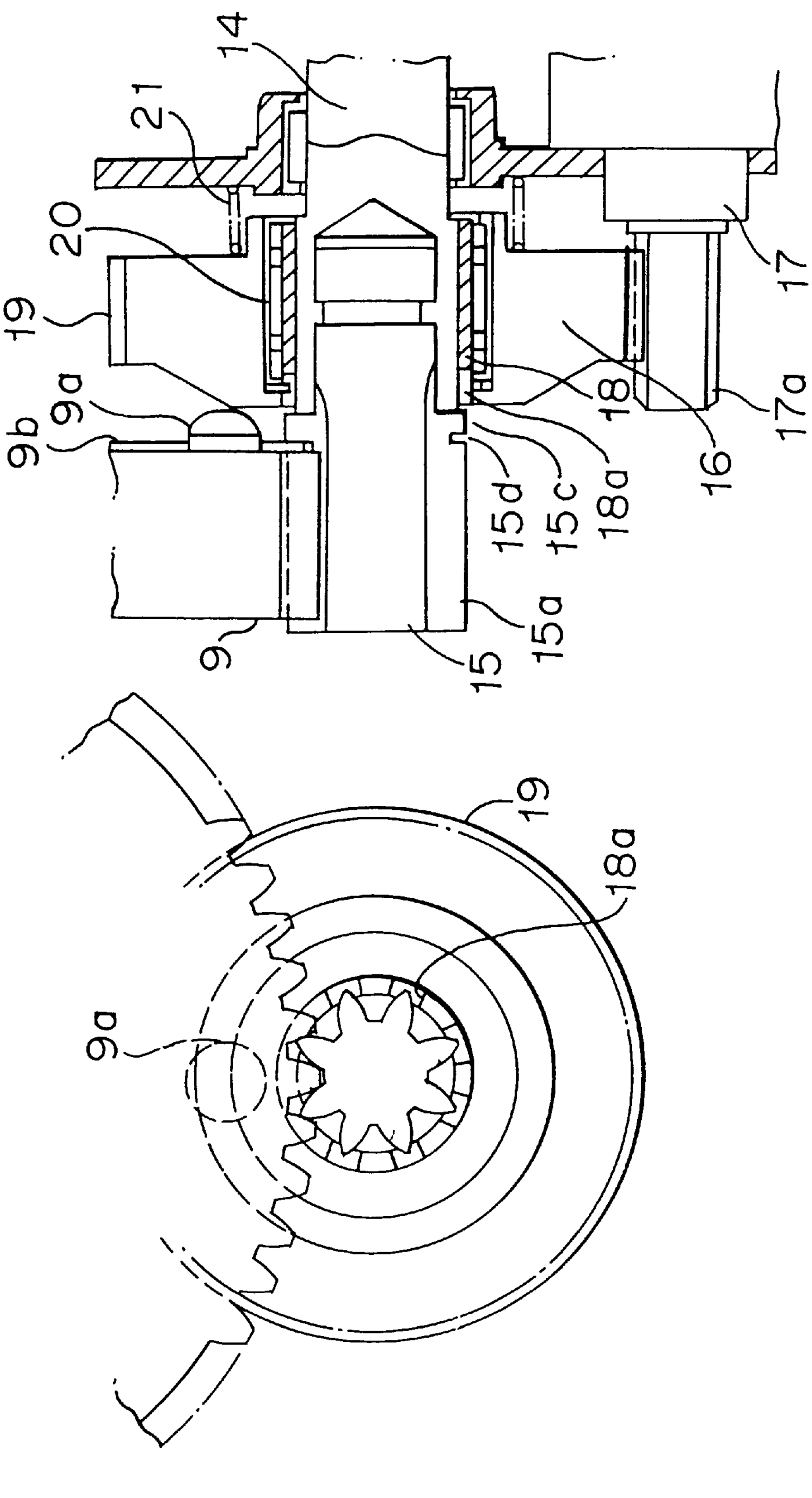
FIG. 3 is a diagram showing a portion in FIG. 2.

FIG. 1 is a front view showing an operation means including the force storing mechanism for a circuit breaker according to Embodiment 1 of the present invention; FIG. 2 is a cross-sectional view of an important portion of the force storing mechanism taken along a line A—A in FIG. 1; and FIG. 3 is a diagram showing the detail of a clutch or portions related thereto in FIG. 2. In FIGS. 1 to 3, the same reference numerals designate the same or corresponding parts as for the conventional technique, and description of these parts is omitted.

A clutch shaft 14 and the rotating shaft of an electric motor 17 are provided in parallel to a cam shaft 8, and these three shafts are drivingly connected with each other through a gear train comprising a gear wheel 9, a pinion 15 formed in an end of the clutch shaft 14, a clutch driving element 16 having a toothed wheel element (an outer wheel 19) at its outer periphery, and a toothed wheel 17*a* formed at an end portion of the shaft of the electric motor 17. A clutch is constituted by the pinion 15 and the clutch driving element 16.

A force storing mechanism is composed of an assembly of elements from the electric motor 17 to a closing spring 89 via the clutch driving element 16, the pinion 15, the gear wheel 9, a link 10, a closing lever 7 and so on.

The cam shaft 8 penetrates through frame walls 1*a,* 1*b* and is supported at its penetrating portions by means of a pair of bearings. A cam 13 is fitted to the cam shaft 8 at an intermediate position between the frame walls 1*a,* 1*b*. The gear wheel 9 is also fitted to an end portion of the cam shaft 8 wherein the gear wheel 9 is provided with a projection (i.e., an end-face cam) 9*a* on the surface at the side of the frame wall 1*a* and a guiding circular plate 9*b* so that the cam shaft 8, the cam 13 and the guiding circular plate 9*b* are rotated as a one-piece body by the rotation of the gear wheel 9. The cam shaft 8 is prevented from moving in its axial direction beyond a play formed in the bearings.

The clutch shaft 14 provided with the pinion 15 at its one end at the side of the frame wall 1*a* penetrates through the frame walls 1*a,* 1*b* and is supported at its penetrating portions by means of a pair of bearings so as to be rotatable and movable in its axial direction to some extent.

The pinion 15 comprises a toothed wheel portion 15*a* meshed with the gear wheel 9, an annular groove 15*d* into which the guiding circular plate 9*b* is fitted, and a small toothed wheel portion 15*c* meshed with radial grooves 18*b* formed in an inner wheel 18. The clutch driving element 16 is fitted to the clutch shaft 14 so as to be movable in the axial direction. The travelling distance of the clutch driving element 16 is regulated by the height of the projection 9*a* provided on the gear wheel 9. When the clutch driving element 16 is pressed by the projection 9*a* to be moved toward the frame wall 1*b*, the meshing engagement between the small toothed wheel portion 15*c* and the radial grooves 18*a* of the inner wheel 18 is disconnected. The projection 9*a* provided on the gear wheel 9 is adapted such that when the gear wheel 9 is rotated clockwise from a position where the gear wheel 9 has slightly passed clockwise the change point of the mechanism to a suitable position for a closing awaiting position, the projection 9*a* presses the clutch driving element 16 toward the frame wall 1*b* to cause a displacement of the element 16 on the clutch shaft 14 by a predetermined distance, whereby the meshing engagement between the small toothed wheel portion 15*c* and the radial grooves 18*a* of the inner wheel 18 is disconnected so that a rotating force of the electric motor 17 is not transmitted to the pinion 15.

The clutch driving element 16 is constituted by the inner wheel 18, the outer wheel 19 and an one-way clutch 20. The inner wheel 18 is fitted to the clutch shaft 14 so as to be rotatable and movable in the axial direction. The outer diametrical surface of the inner wheel 18 is fitted to the one-way clutch 20. Further, the end portion facing the small toothed wheel portion 15*c*, of the inner wheel 18 is provided with the radial grooves 18*a* having the same number of teeth as the small toothed wheel portion 15*c* so that they are meshed with each other.

The outer wheel 19 is meshed at an outer peripheral toothed wheel portion thereof with a toothed wheel portion 17*a* formed in the shaft end of the electric motor 17 and fitted at the inner diametrical surface thereof with the one-way clutch 20 so that it is mutually rotatable with respect to the inner wheel 18 while not causing a relative movement in the axial direction. The one-way clutch 20 is so adapted that it transmits a rotational torque from the outer wheel 19 to the inner wheel 18 only when the outer wheel 19 is rotated counterclockwise with respect to the inner wheel 18 as seen from the side of the pinion 15. The tooth width of the toothed wheel portion 17*a* formed in the shaft end of the electric motor 17 is so adapted that, even when the clutch driving element 16 is displaced by the projection 9*a*, they are continually meshed with each other.

A clutch spring 21 for continually pressing the clutch driving element 16 toward the pinion 15 is provided between the frame wall 1*a* and the clutch driving element 16.

The annular groove 15*d* is formed in the pinion 15 at a position facing a side surface of the gear wheel 9, and the guiding circular plate 9*b* is firmly attached to the side surface of the gear wheel 9. The outer diameter of the guiding circular plate 9*b* is substantially equal to or slightly larger than the outer diameter of the gear wheel 9. The relationship between the thickness of the guiding circular plate 9*b* and the width of the annular groove 15*d* is such that the guiding circular plate 9*b* is fitted to the annular groove 15*b* without an excessive clearance while it is freely movable.

The operation of the force storing mechanism will be described. A series of the closing operations, i.e., the disconnection of a closing latch 11 by means of a closing trigger mechanism 12, the movement of the mechanism comprising the closing lever 7, the gear wheel 9 and the cam 11 by discharging a mechanical energy stored in the closing spring, and the closing of the movable contact 100 are the same as that in the conventional operation mechanism.

The operation for storing a mechanical energy in a closing spring 89 after the closing of the movable contact 100 is as follows.

The electric motor 17 is rotated clockwise and the clutch driving element 16 is rotated counterclockwise by the tooth wheel portion 17*a* formed in the shaft end of the electric motor 17. In a state that the closing spring has discharged the mechanical energy, the projection 9*a* provided on a side surface of the gear wheel 9 is at a position apart from the clutch driving element 16. Accordingly, the clutch driving element 16 is pressed by the clutch spring 21, and the small toothed wheel portion 15*c* is brought to mesh with the radial grooves 18*a* formed in an end portion of the inner wheel 18, whereby the pinion 15 is rotated in the same direction as the clutch driving element 16. When the gear wheel 9 being rotated has slightly passed clockwise the change point of the mechanism, the projection 9*a* presses the clutch driving element 16 to move it toward the frame wall 1*b*. Thus, the linkage between the pinion 15 and the clutch driving element 16 is disconnected. After the disengagement of linkage between the pinion 15 and the clutch driving element 15, the gear wheel 9 is furthermore rotated clockwise by a small amount and is stopped at its closing awaiting position by the closing latch 11.

The relative positional relation in axial direction between the clutch shaft 14 and the cam shaft 8 is regulated by means of the annular groove 15*d* formed in the pinion 15 and the guiding circular plate 9*b* provided at a side surface of the gear wheel 9. The linkage between the small toothed wheel portion 15*c* and the clutch driving element 16 is disconnected at a position which is determined by the shape (the height) of the projection 9*a* and the thickness of the small toothed wheel portion 15*c*.

Since the linkage between the clutch driving element 16 and the small toothed wheel portion 15*c* is disconnected from the point immediately before the reaching of the mechanism to its closing awaiting position, a force due to an output torque of the electric motor 17 does not act upon the closing latch 11 and the gear wheel 9 even if the electric motor 17 rotates after the stopping of the gear wheel 9.

Figure 4:
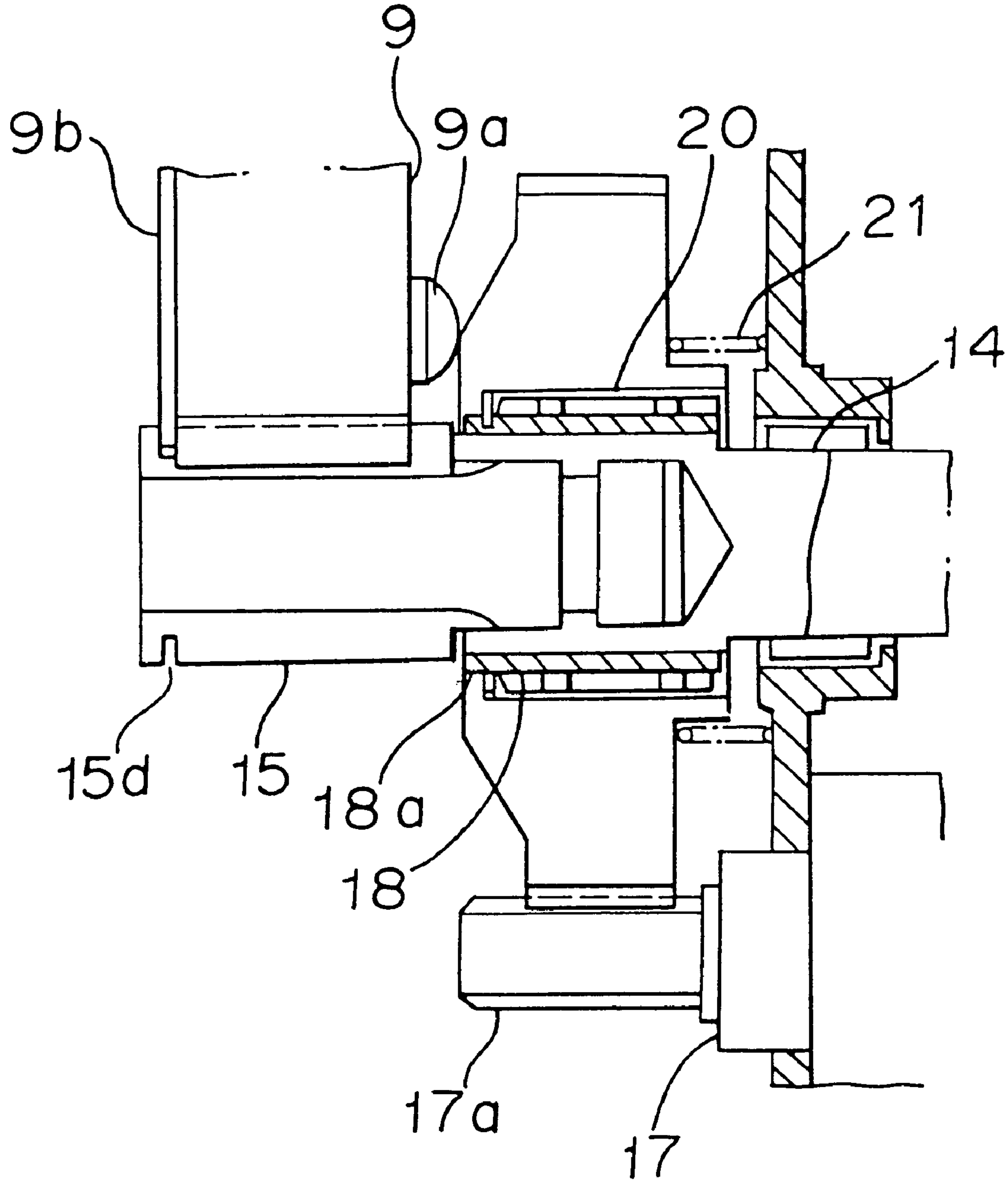
FIG. 4 is a diagram showing a modified form of the embodiment shown in FIG. 1.

In the above-mentioned, the annular groove 15*d* is provided between the toothed wheel portion 15*a* which meshes with the gear wheel 19 and the toothed wheel portion 15*c* which meshes with the radial grooves 18*a* of the inner wheel. However, as shown in FIG. 4, an annular groove 15*d* may be formed in the pinion 15 at a position near the free end of the pinion, and a guiding circular plate 9*b* is fixed to the gear wheel 9 at its another side surface so that the guiding circular plate 9*b* is fitted to the annular groove 15*d*.

EMBODIMENT 2

Figure 5:
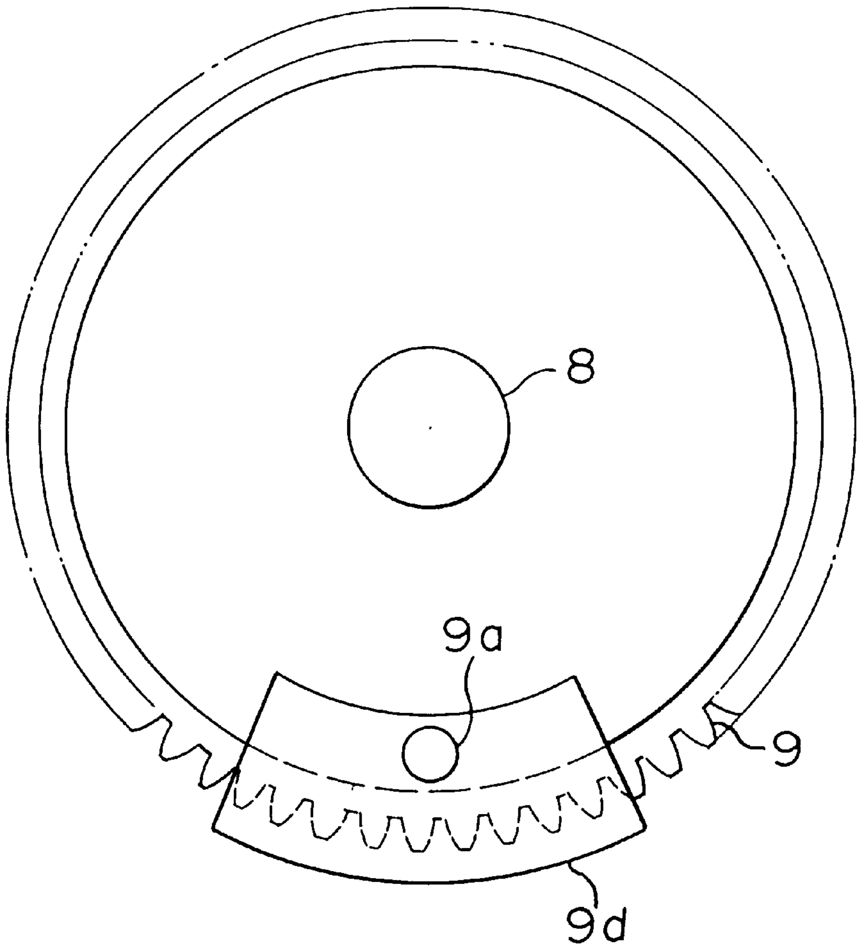
FIGS. 5*a,* 5*b* are a front view and a side view of a part used for the force storing mechanism according to a second embodiment of the present invention.
Figure 5:
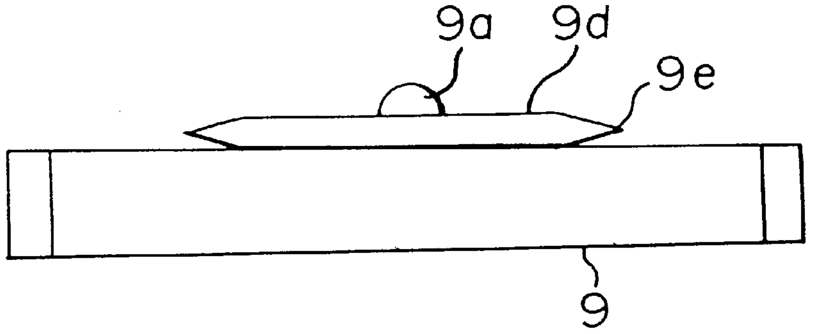

FIG. 5 shows another embodiment of the present invention which minimizes the wearing the annular groove 15*d* due to continuous friction of the groove 15*d* to the guiding circular plate 9*b*. Further, the embodiment 2 eliminates a problem in assembling operations of the guiding circular plate 9*b* in Embodiment 1 wherein the guiding circular plate 9*b* having a relatively large dimensions is provided at a side surface of the gear wheel 9.

A correct positional relation between the gear wheel 9 and the pinion 15 can be maintained only during a state that the projection 9*a* is in contact with the outer wheel 19 in the rotation of the gear wheel 9 (namely, it is merely in an angle of about 10° (degree)), and it is unnecessary for the positional relation to be precise in an angular region other than the projection 9*a* is in contact with the outer wheel 19.

For this purpose, the guiding plate to be provided at a side surface of the gear wheel 9 is formed to have a circular arc shape (designates as 9*d* in FIG. 5) which should be provided in a necessary angular range in the gear wheel 9. FIG. 5*a* is a plane view showing the gear wheel 9 and the circular arc plate 9*d*, and FIG. 5*b* is a side view of them.

The circular arc plate 9*d* is in a sectorial shape or a circular arc shape. Both end portions where the circular arc plate 9*d* fit into the annular groove 15*d* are tapered as designated as reference numeral 9*e*. Thus, even when the gear wheel 9 is rotated at a high speed, the circular arc plate 9*d* can smoothly be inserted in the groove 15*d*. In this case, the width of the groove 15*d* and the thickness of the circular arc plate 9*d* should be slightly larger than the dimension of a play of the clutch shaft 14 whereby there is no danger of the impinging of the circular arc plate 9*d* against the pinion 15.

EMBODIMENT 3

Figure 6:
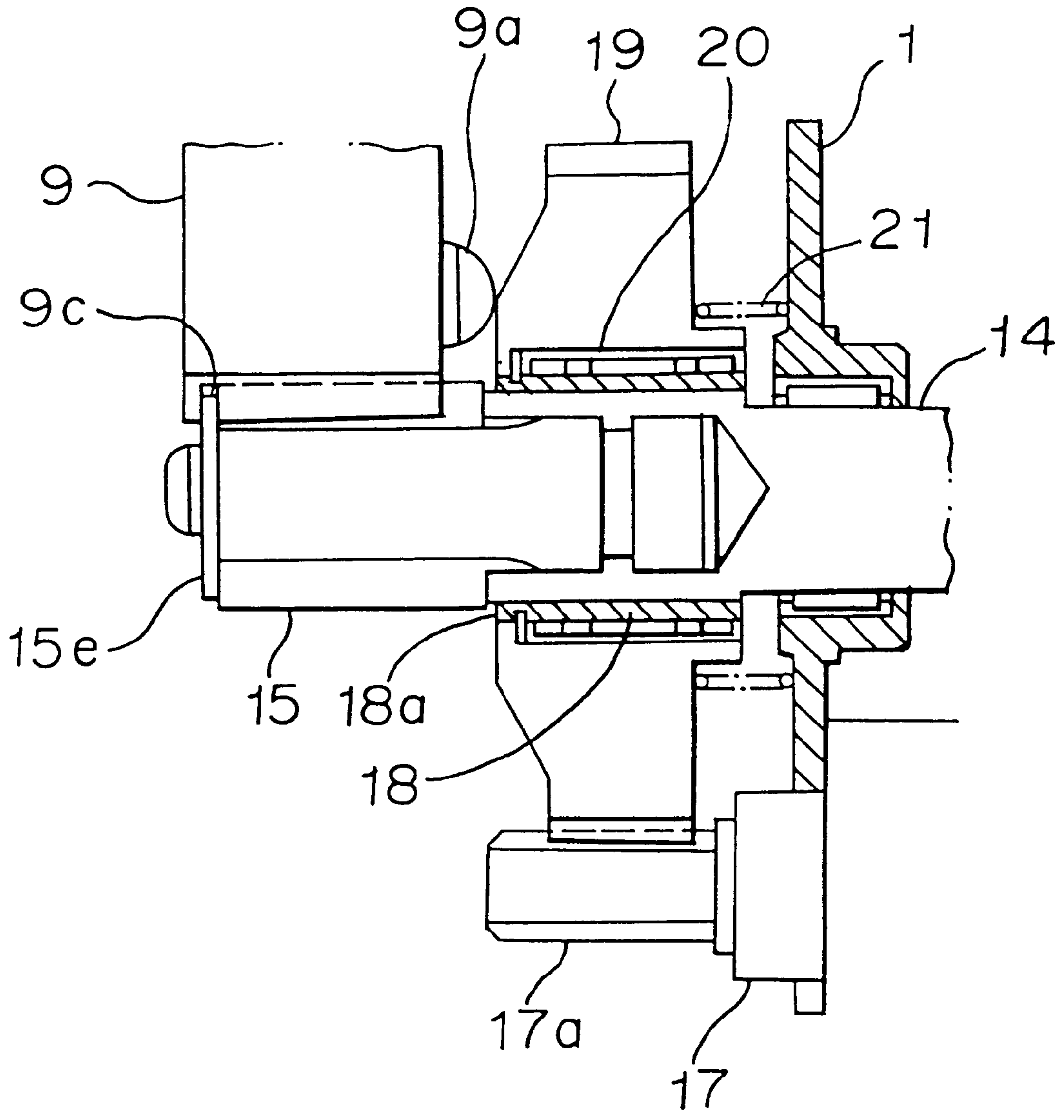
FIG. 6 is a diagram showing a portion in the force storing mechanism according to a third embodiment of the present invention.

FIG. 6 shows another embodiment of the present invention.

In FIG. 6, an annular groove 9*c* is formed at a position near the end portion opposite the side where the projection 9*a* is formed, of the gear wheel 9. A guiding circular plate 15*e* is provided on the pinion 15 at the position corresponding to the annular groove 9*c*. With this provision, the linkage between the pinion 15 and the clutch driving element 16 can correctly be disconnected.

EMBODIMENT 4

Figure 7:
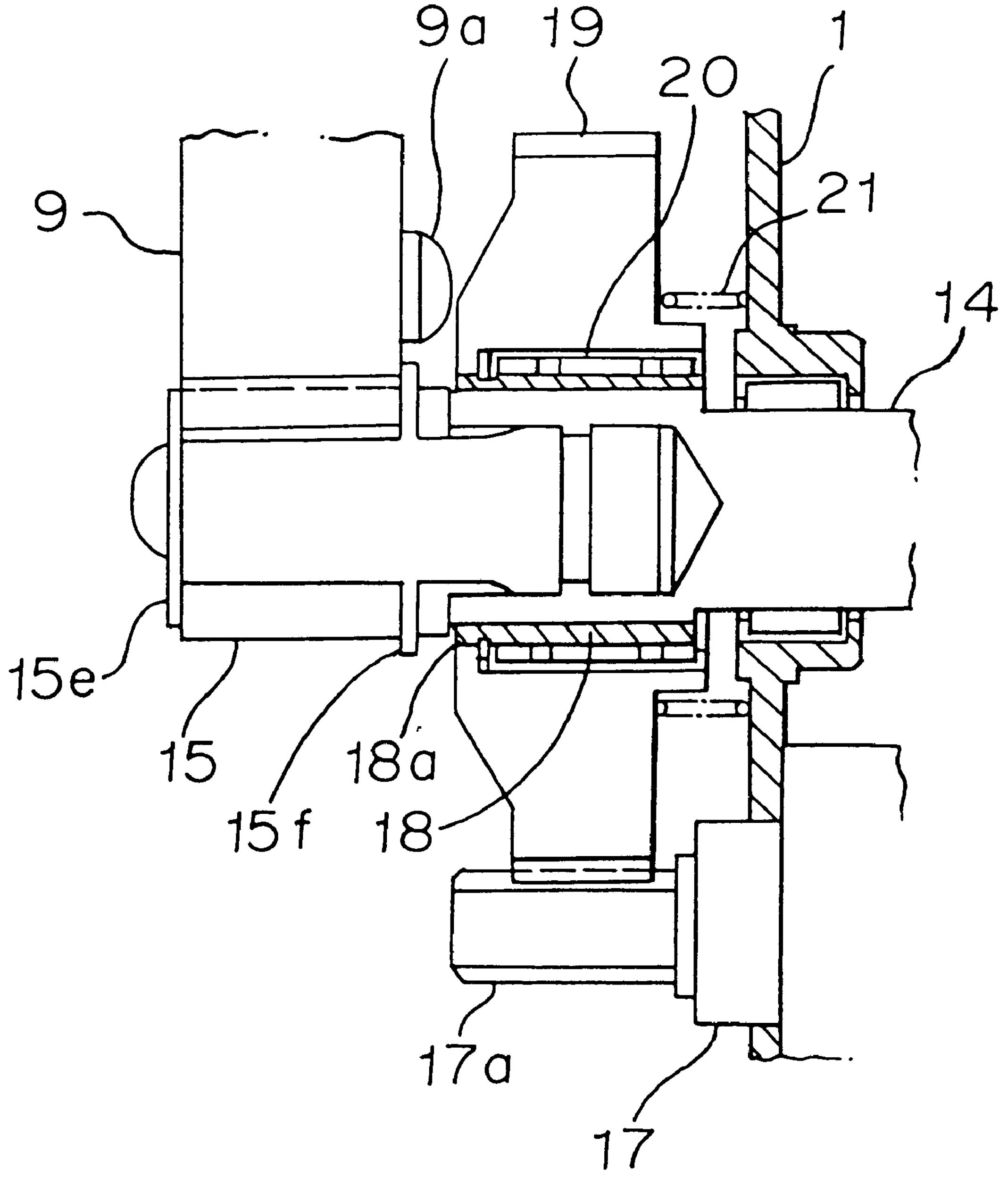
FIG. 7 is a diagram showing a portion in the force storing mechanism according to a fourth embodiment of the present invention.
Figure 8:
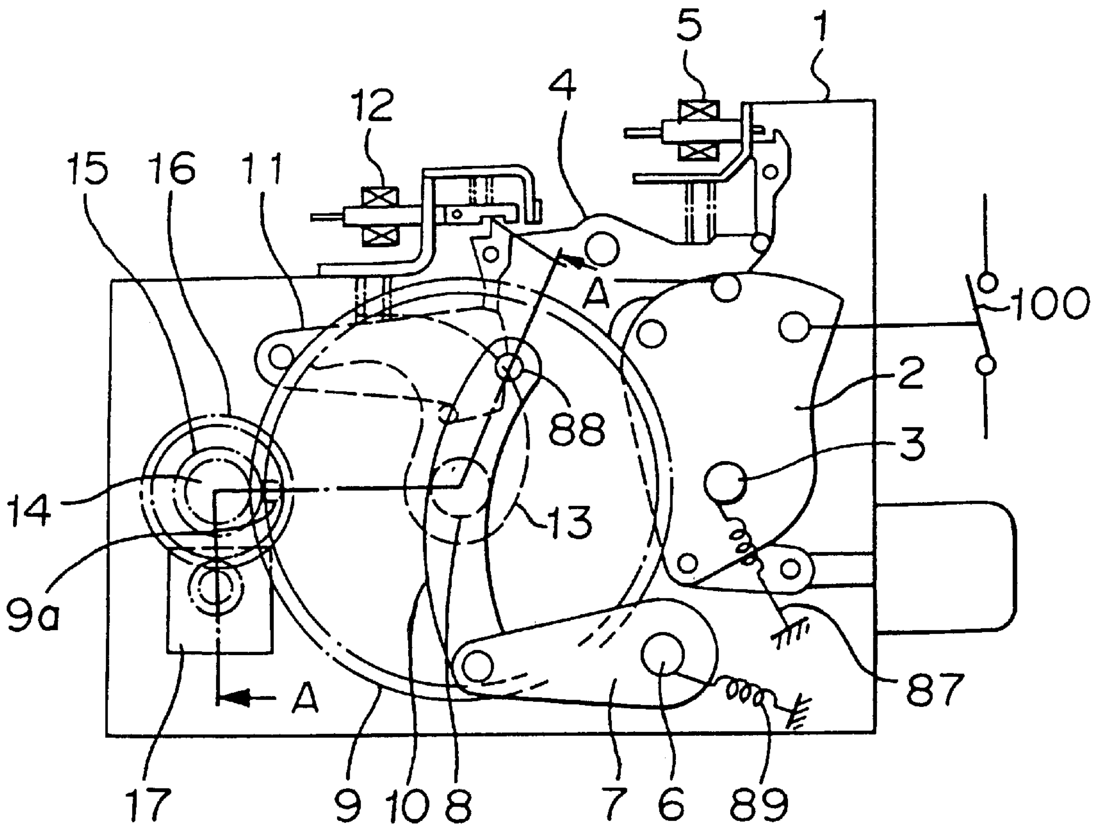
FIGURE 8 PRIOR ART
FIG. 8 is a front view showing a conventional operation means for a circuit breaker which is in a circuit closing state.
Figure 9:
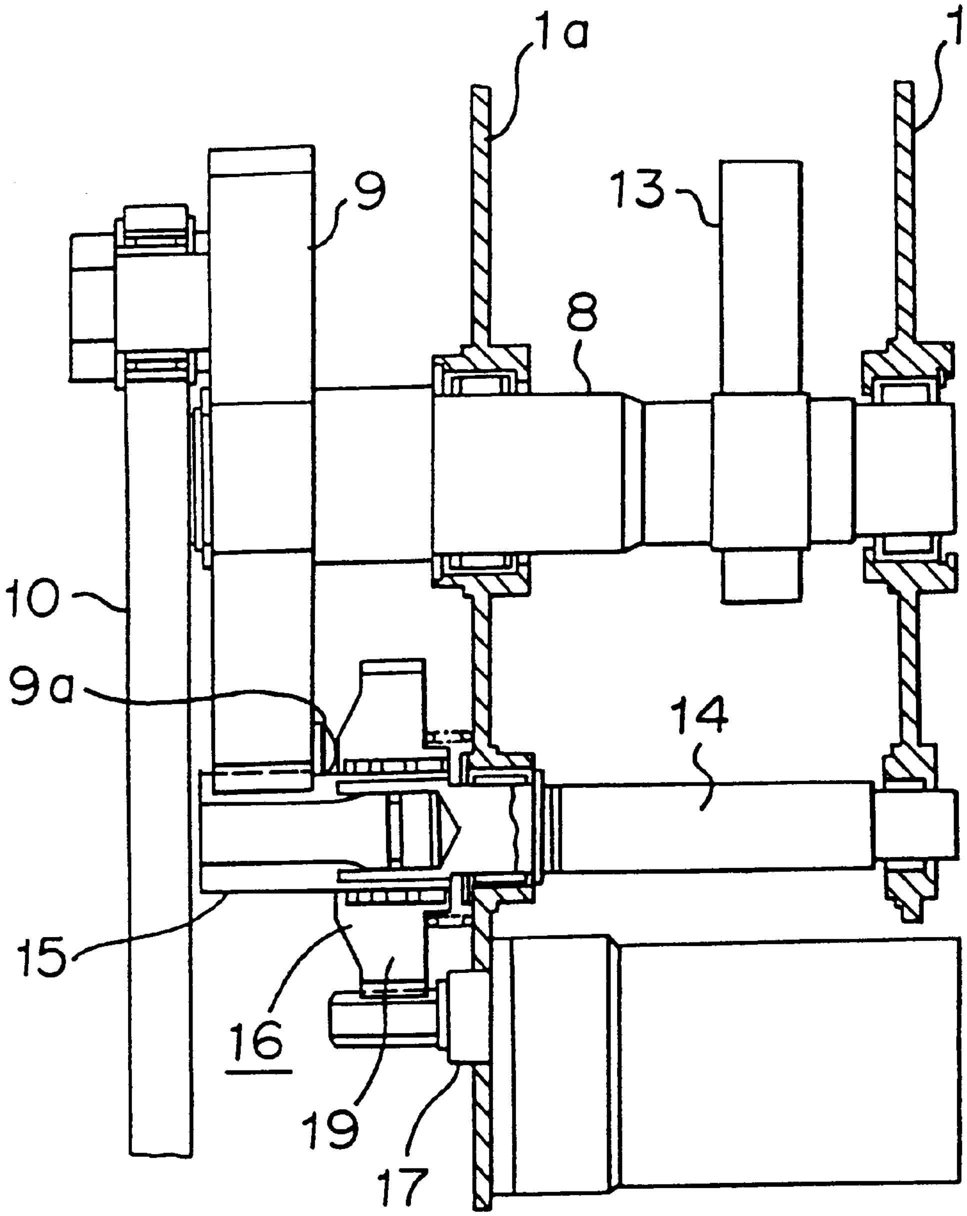
FIGURE 9 PRIOR ART
FIG. 9 is a cross-sectional view showing a portion in the operation means in FIG. 8.
Figure 10:
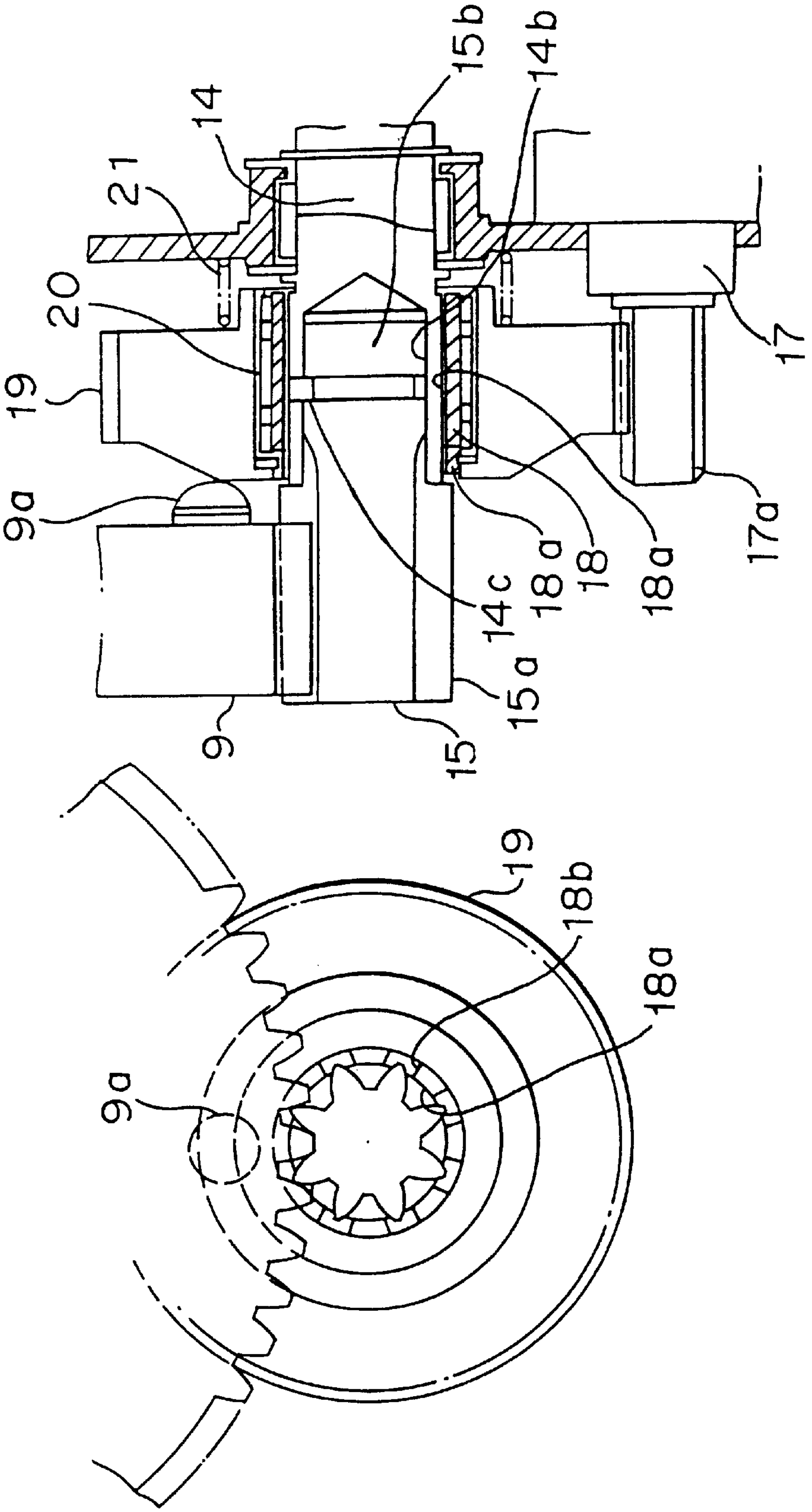
FIGURE 10 PRIOR ART
FIG. 10 is a diagram showing a portion shown in FIG. 9.
Figure 11:
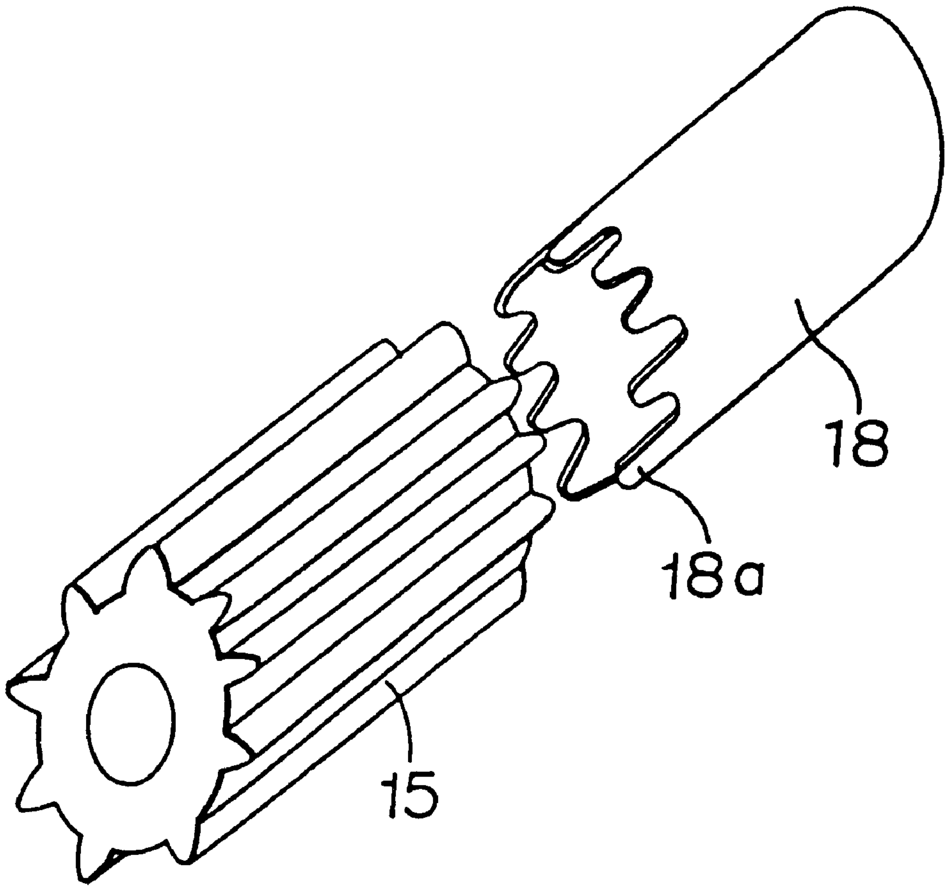
FIGURE 11 PRIOR ART
FIG. 11 is a perspective view showing parts shown in FIG. 10.
Figure 12:
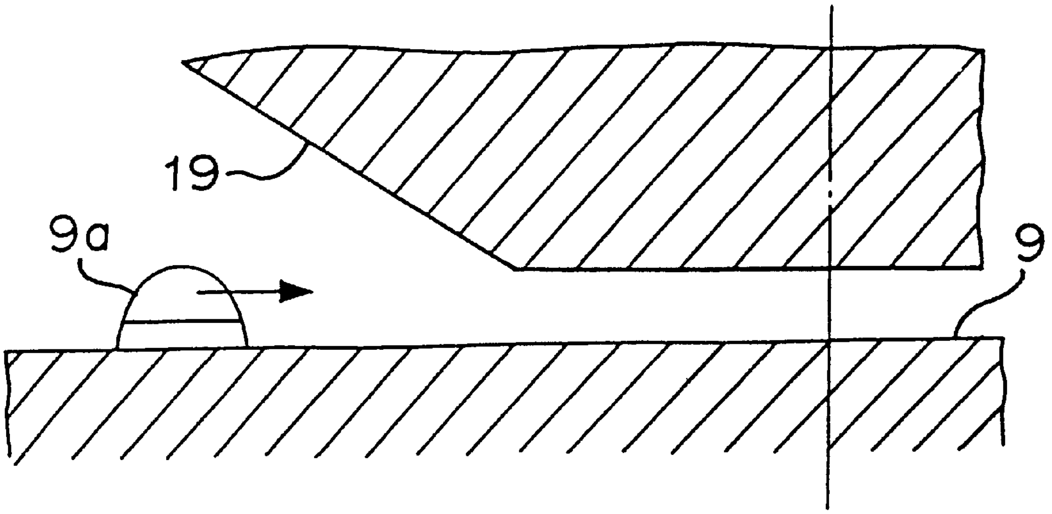
FIGURE 12 (a) PRIOR ART
FIGS. 12*a,* 12*b* are diagrams showing the operations of the operation means shown in FIG. 10.
Figure 12:
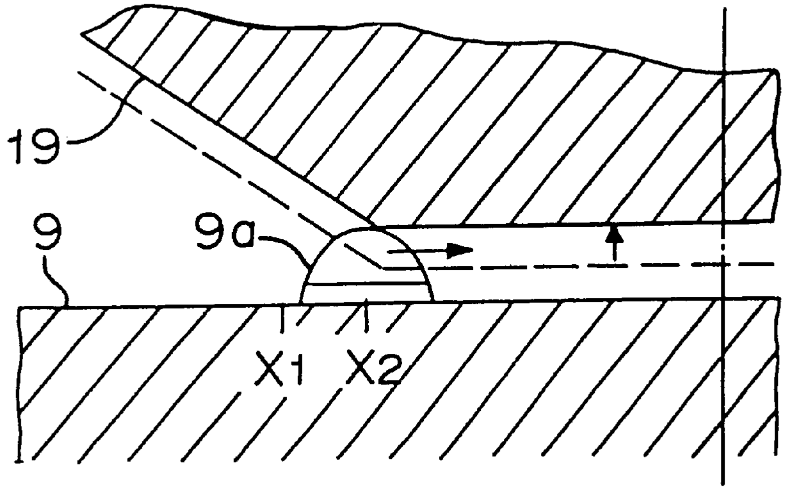
FIGURE 12 (b) PRIOR ART

FIG. 7 shows another embodiment of the present invention.

As shown in FIG. 7, a guiding circular plate 15*e* and a guiding circular plate 15*f* are provided on the pinion 15 so that the guiding circular plates 15*e*, 15*f* are in slide-contact with both side surfaces of the gear wheel 9. With this, the linkage between the pinion 15 and the clutch driving element 16 can correctly be disconnected. In this embodiment, cutting operations for the groove in Embodiment 1, 2 and 3 are unnecessary.

In the force storing mechanism for a circuit breaker according to Embodiment 1 and Embodiment 3, the annular groove and the guiding circular plate to be fitted to the groove are provided so that the relative position in axial direction between the pinion and the gear wheel is always kept constant. Accordingly, by correctly adjusting the height of the end-face cam (the projection) provided at a side surface of the gear wheel to a previously determined height, an angular position of the gear wheel at which the clutch operates can correctly be determined. Further, re-adjustment of the height of the projection is unnecessary.

In the force storing mechanism for a circuit breaker according to Embodiment 2 of the present invention, the circular arc plate which extends to only a required angular range in the circumference of the gear wheel is used. Accordingly, an amount of wearing of the annular groove formed in the pinion is small.

In the force storing mechanism for a circuit breaker according to Embodiment 4 of the present invention, a relative positional relation in axial direction between the pinion and the gear wheel is kept constant by interposing the gear wheel between two guiding circular plates. Accordingly, an angular range of the gear wheel at which the clutch operates is correctly determined by correctly adjusting the height of the end-face cam (projection) provided at a side surface of the gear wheel to a regulated value. Further, re-adjustment through gauging works is unnecessary.

Obviously, numerous modifications and variations of the present invention are possible in light of the above teachings. It is therefore to be understood that within the scope of the appended claims, the invention may be practiced otherwise than as specifically described herein.

What is claimed is:

1. In a force storing mechanism for a circuit breaker wherein energy stored in a breaking spring is discharged to effect a circuit opening operation to a contact, and energy is stored in the breaking spring, by means of a cam shaft and a cam fixed to the cam shaft via a driving means which is driven by a motor, the force storing mechanism being characterized by comprising:

a gear wheel fixed to a cam shaft;

a pinion meshed with the gear wheel;

a clutch driving element provided on the same axis as the pinion, which constitutes a clutch together with the pinion, and is driven by an electric motor; and an end-face cam provided at a side surface of the gear wheel and pressing the clutch driving element at or near a stationary position of the gear wheel to release a connection between the pinion and the clutch driving element, wherein the gear wheel has a guiding circular plate fixed to a side surface of the gear wheel, and the pinion has a groove fitted to the guiding circular plate so as to maintain a relative position in an axial direction of the gear wheel and the pinion to be constant.

2. A force storing mechanism for a circuit breaker according to claim 1, wherein a circular arc plate is provided instead of the guiding circular plate, at a periphery of the gear wheel in the vicinity of the position where the end-face cam is provided.

3. In a force storing mechanism for a circuit breaker wherein energy stored in a breaking spring is discharged to effect a circuit opening operation to a contact, and energy is stored in the breaking spring, by means of a cam shaft and a cam fixed to the cam shaft via a driving means which is driven by a motor, the force storing mechanism being characterized by comprising:

a gear wheel fixed to a cam shaft;

a pinion meshed with the gear wheel;

a clutch driving element provided on the same axis as the pinion, which constitutes a clutch together with the pinion, and is driven by an electric motor; and an end-face cam provided at a side surface of the gear wheel and pressing the clutch driving element at or near a stationary position of the gear wheel to release a connection between the pinion and the clutch driving element, wherein the pinion has a guiding circular plate fixed to a side surface of the gear wheel, and the gear wheel has a groove fitted to the guiding circular plate so as to maintain a relative position in an axial direction of the gear wheel and the pinion to be constant.

4. In a force storing mechanism for a circuit breaker wherein energy stored in a breaking spring is discharged to effect a circuit opening operation to a contact, and energy is stored in the breaking spring, by means of a cam shaft and a cam fixed to the cam shaft via a driving means which is driven by a motor, the force storing mechanism being characterized by comprising:

a gear wheel fixed to a cam shaft;

a pinion meshed with the gear wheel;

a clutch driving element provided on the same axis as the pinion, which constitutes a clutch together with the pinion, and is driven by an electric motor; and an end-face cam provided at a side surface of the gear wheel and pressing the clutch driving element at or near a stationary position of the gear wheel to release a connection between the pinion and the clutch driving element, wherein the pinion has two guiding circular plates fixed to an intermediate position between a free end and a tooth surface of the pinion and the gear wheel is fitted to the space between the two guiding circular plates so as to maintain a relative position in an axial direction of the gear wheel and the pinion to be constant.

* * * * *